United States Patent
Macias et al.

(10) Patent No.: US 10,170,146 B2
(45) Date of Patent: Jan. 1, 2019

(54) MOUNTING A SMARTPHONE TO ROBOTIC ACCESSOR OF AUTOMATED DATA STORAGE LIBRARY

(71) Applicant: International Business Machines Corporation, Armonk, NY (US)

(72) Inventors: Luis R. Macias, Tucson, AZ (US); Shawn M. Nave, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/890,170

(22) Filed: Feb. 6, 2018

(65) Prior Publication Data
US 2018/0158480 A1    Jun. 7, 2018

Related U.S. Application Data

(62) Division of application No. 15/264,214, filed on Sep. 13, 2016.

(51) Int. Cl.
| | | |
|---|---|---|
| G11B 15/68 | (2006.01) | |
| G11B 33/04 | (2006.01) | |
| G11B 33/12 | (2006.01) | |
| G11B 31/00 | (2006.01) | |
| B65G 1/04 | (2006.01) | |

(52) U.S. Cl.
CPC ........ G11B 15/6835 (2013.01); B65G 1/0407 (2013.01); G11B 31/006 (2013.01); G11B 33/04 (2013.01); G11B 33/127 (2013.01); B65G 2203/041 (2013.01)

(58) Field of Classification Search
None
See application file for complete search history.

(56) References Cited

U.S. PATENT DOCUMENTS

| | | | |
|---|---|---|---|
| 4,979,135 A | 12/1990 | Moy | |
| 5,237,468 A | 8/1993 | Ellis | |
| 5,303,034 A | 4/1994 | Carmichael et al. | |
| 5,323,327 A | 6/1994 | Carmichael et al. | |
| 5,331,232 A | 7/1994 | Moy et al. | |
| 6,138,909 A | 10/2000 | Rockwell et al. | |
| 7,117,068 B2 | 10/2006 | Critchlow | |
| 9,953,676 B2 | 4/2018 | Macias et al. | |
| 10,096,336 B2 | 10/2018 | Macias et al. | |
| 2012/0197439 A1* | 8/2012 | Wang et al. ........... | B25J 9/1689 700/259 |

(Continued)

OTHER PUBLICATIONS

Macias et al., U.S. Appl. No. 15/264,214, filed Sep. 13, 2016.
(Continued)

*Primary Examiner* — Craig A. Renner
(74) *Attorney, Agent, or Firm* — Zilka-Kotab, P.C.

(57) ABSTRACT

According to one embodiment, a method for mounting a wireless capture device to an accessor to capture images of an operation in a data storage library includes mounting a bracket to the accessor, where the accessor is configured to transport data storage cartridges in a library environment. Moreover, the bracket is configured to receive a wireless image capture device therein, and the bracket is mounted in a position to orient the wireless image capture device to capture images while the accessor is transporting data storage cartridges.

18 Claims, 14 Drawing Sheets

(56) References Cited

U.S. PATENT DOCUMENTS

2015/0283701 A1  10/2015  Izhikevich et al.
2016/0107312 A1   4/2016  Morrill et al.
2018/0075873 A1   3/2018  Macias et al.
2018/0158479 A1   6/2018  Macias et al.

OTHER PUBLICATIONS

Restriction Requirement from U.S. Appl. No. 15/264,214, dated May 17, 2017.
Non-Final Office Action from U.S. Appl. No. 15/264,214, dated Jun. 29, 2017.
Notice of Allowance from U.S. Appl. No. 15/264,214, dated Dec. 15, 2017.
Macias et al., U.S. Appl. No. 15/890,133, filed Feb. 6, 2018.
Ex Parte Quayle from U.S. Appl. No. 15/890,133, dated Mar. 28, 2018.
Notice of Allowance from U.S. Appl. No. 15/890,133, dated May 31, 2018.
Supplemental Notice of Allowance from U.S. Appl. No. 15/890,133, dated Jun. 20, 2018.
Macias et al., U.S. Appl. No. 16/114,128, filed Aug. 27, 2018.

* cited by examiner

MOUNTING A SMARTPHONE TO ROBOTIC ACCESSOR OF AUTOMATED DATA STORAGE LIBRARY

BACKGROUND

The present invention relates to data storage systems, and more particularly, this invention relates to automated data storage libraries.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Automated storage libraries use one or more robotic mechanisms as a part of the accessor to move data storage media back and forth from storage elements or import export elements to data storage drives within the library. Troubleshooting issues with the accessor and the associated robotic mechanisms may be addressed with a method to record images of the activity of the accessor robotic components while the accessor is running.

SUMMARY

According to one embodiment, a method for mounting a wireless capture device to an accessor to capture images of an operation in a data storage library includes mounting a bracket to the accessor, where the accessor is configured to transport data storage cartridges in a library environment. Moreover, the bracket is configured to receive a wireless image capture device therein, and the bracket is mounted in a position to orient the wireless image capture device to capture images while the accessor is transporting data storage cartridges.

According to another embodiment, a method for capturing an image of an operation in a data storage library with a bracket on an accessor includes locating a bracket mounted in a position to orient a wireless image capture device on the accessor and mounting the wireless image capture device into the bracket, where an aperture of the bracket is aligned with an aperture of the wireless image capture device. In addition, the method includes running the accessor while the wireless image capture device is recording images of the operation in the data storage library, stopping the recording of images of the operation by the wireless image capture device, removing the wireless image capture device from the bracket on the accessor, and viewing the recorded images.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof. In one general embodiment, an apparatus includes an accessor configured to transport data storage cartridges in a library environment, and a bracket configured to receive a wireless image capture device therein, where the bracket is positioned to orient the wireless image capture device to capture images while the accessor is transporting data storage cartridges.

In another general embodiment, a method for mounting a wireless capture device to an accessor to capture images of an operation in a data storage library includes mounting a bracket to the accessor, where the accessor is configured to transport data storage cartridges in a library environment, where the bracket is configured to receive a wireless image capture device therein. Moreover, the bracket is mounted in a position to orient the wireless image capture device to capture images while the accessor is transporting data storage cartridges.

In another general embodiment, a method for capturing an image of an operation in a data storage library with a bracket on an accessor includes locating a bracket mounted in a position to orient a wireless image capture device on the accessor. The method further includes mounting the wireless image capture device into the bracket wherein an aperture of the bracket is aligned with an aperture of the wireless image capture device. The accessor is run while the wireless image capture device is recording images of the operation in the data storage library. The recording of the images of the operation by the wireless image capture device is stopped, and the wireless image capture device is removed from the bracket on the accessor and the recorded images are viewed.

Figure 1:
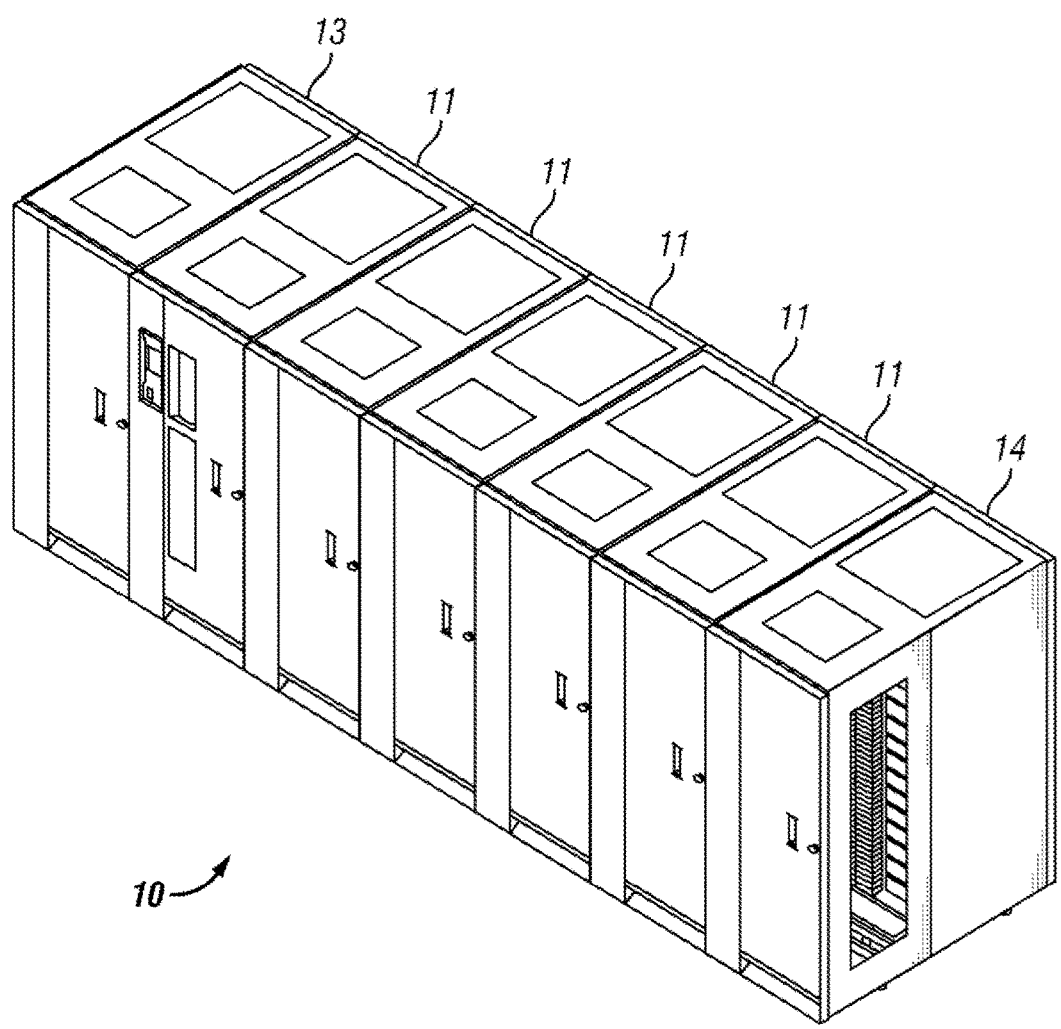
FIG. 1 is a perspective view of an automated data storage library according to one embodiment.
Figure 2:
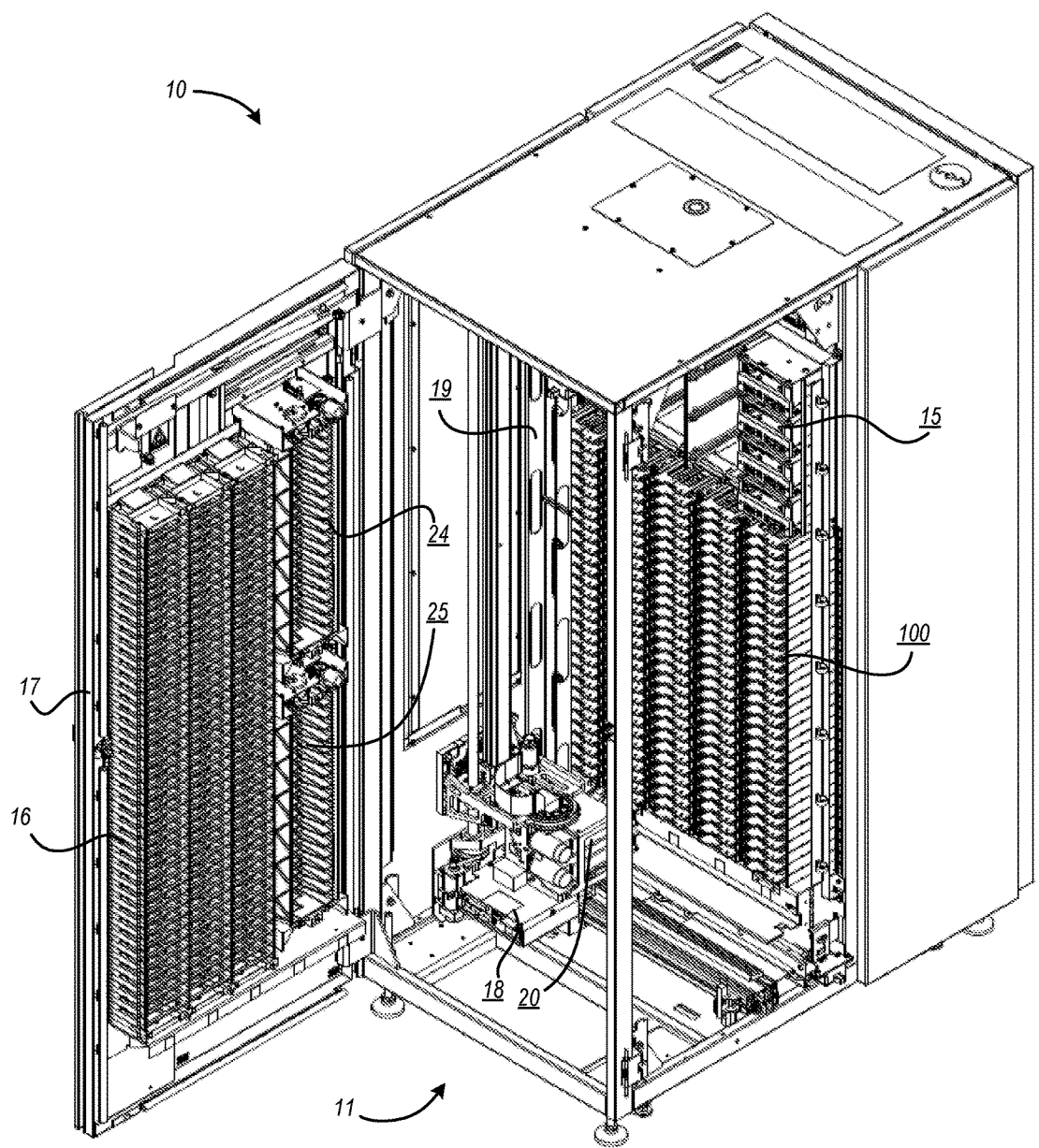
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
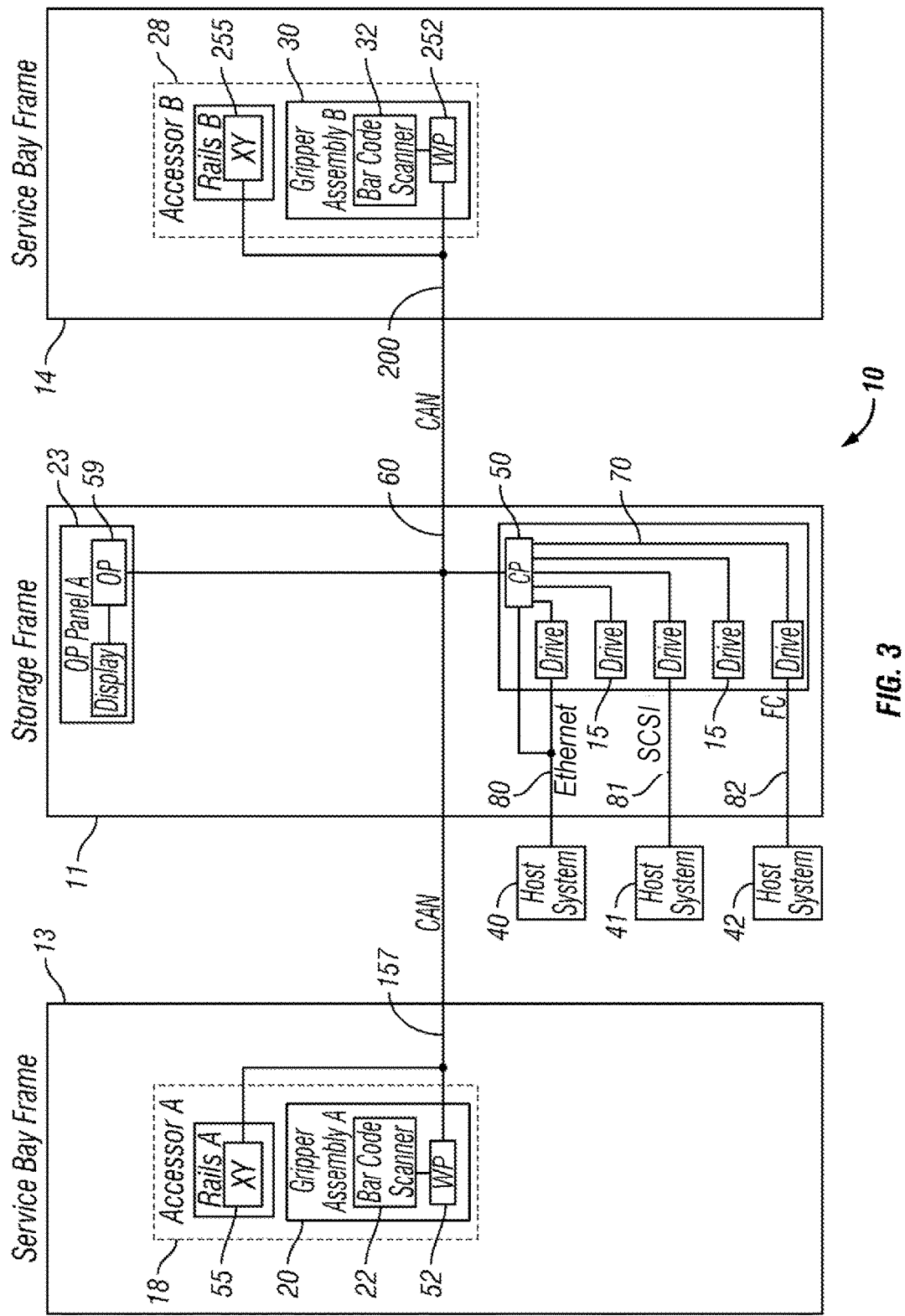
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
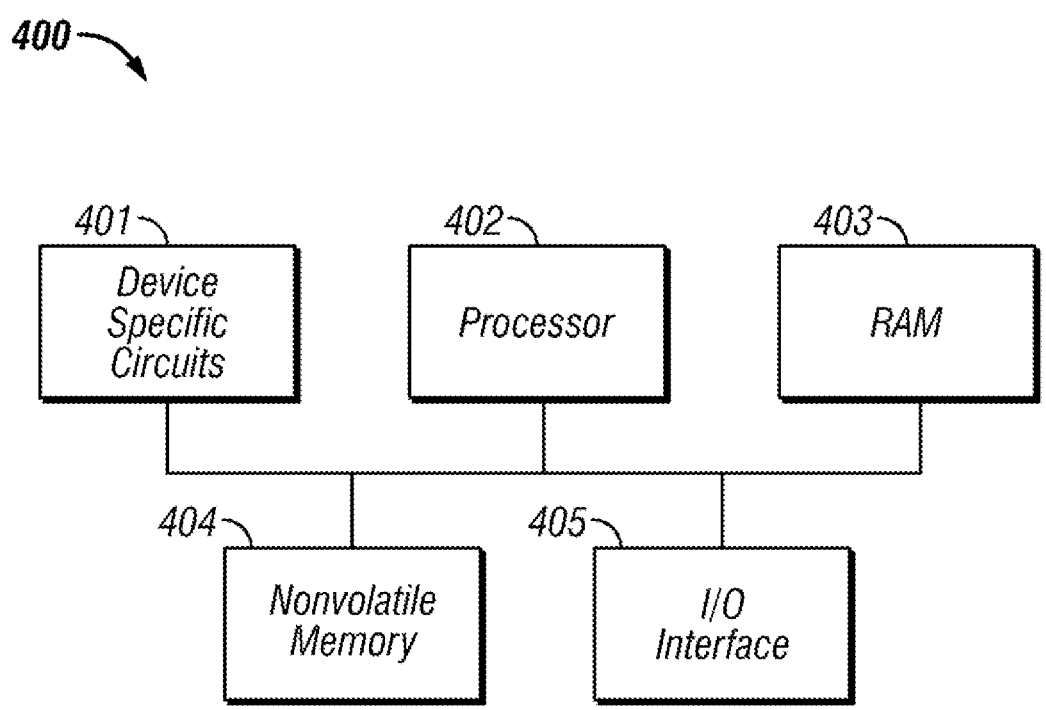
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
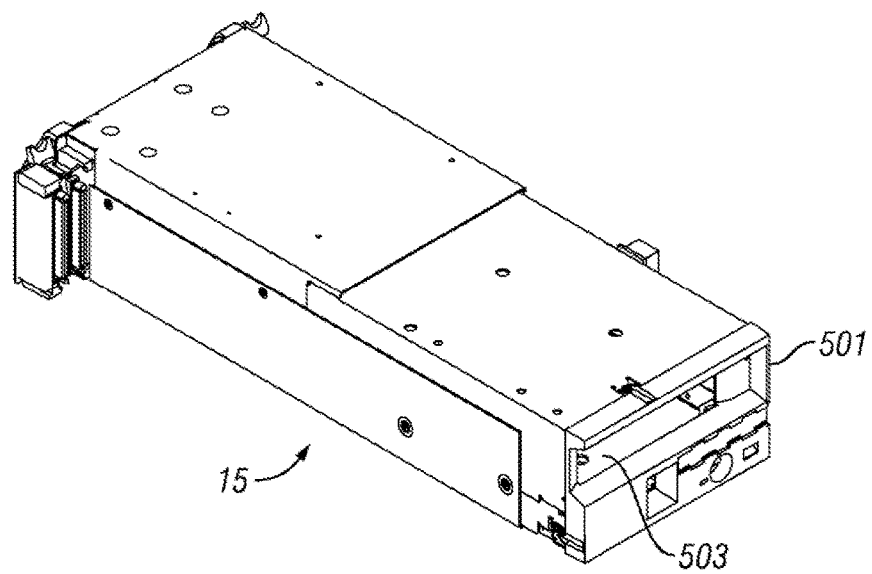
FIG. 5A is a front perspective view of a data storage drive according to one embodiment.
Figure 5B:
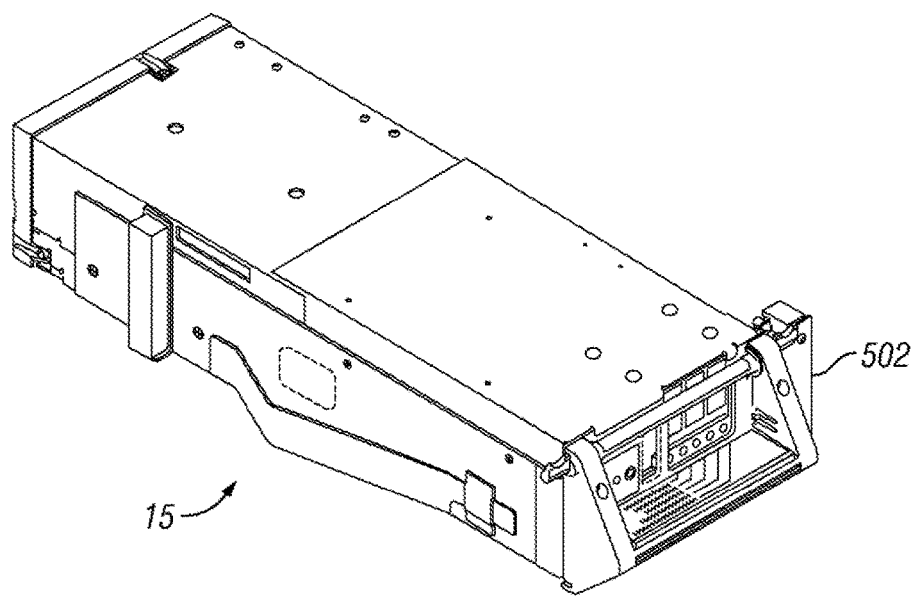
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
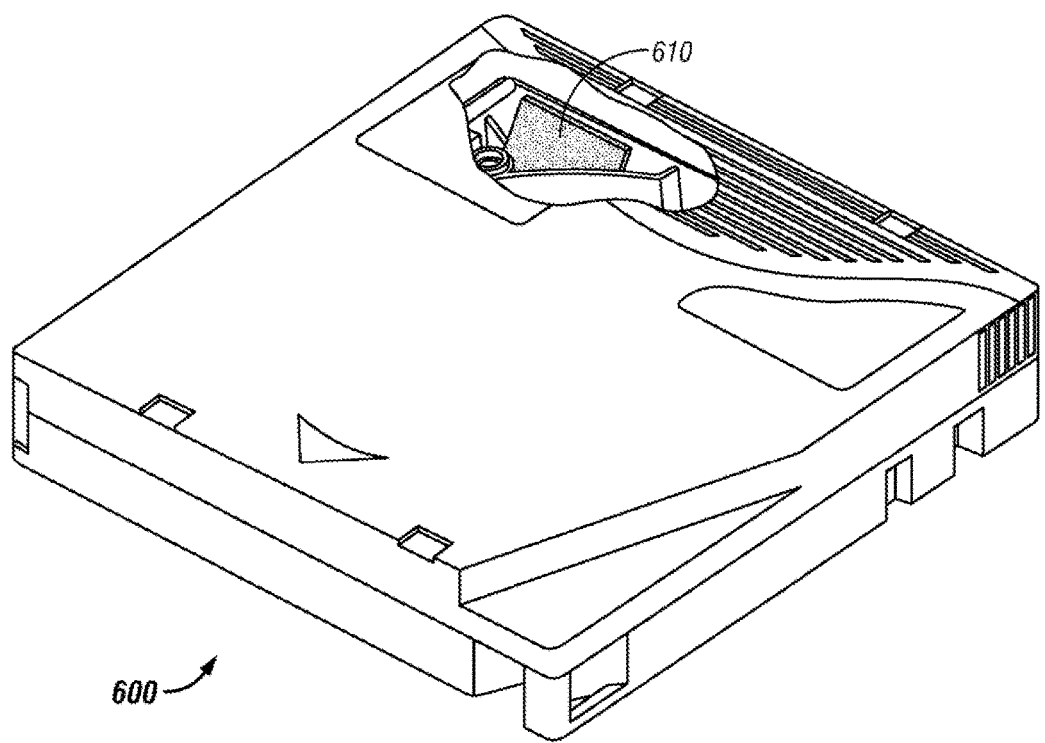
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
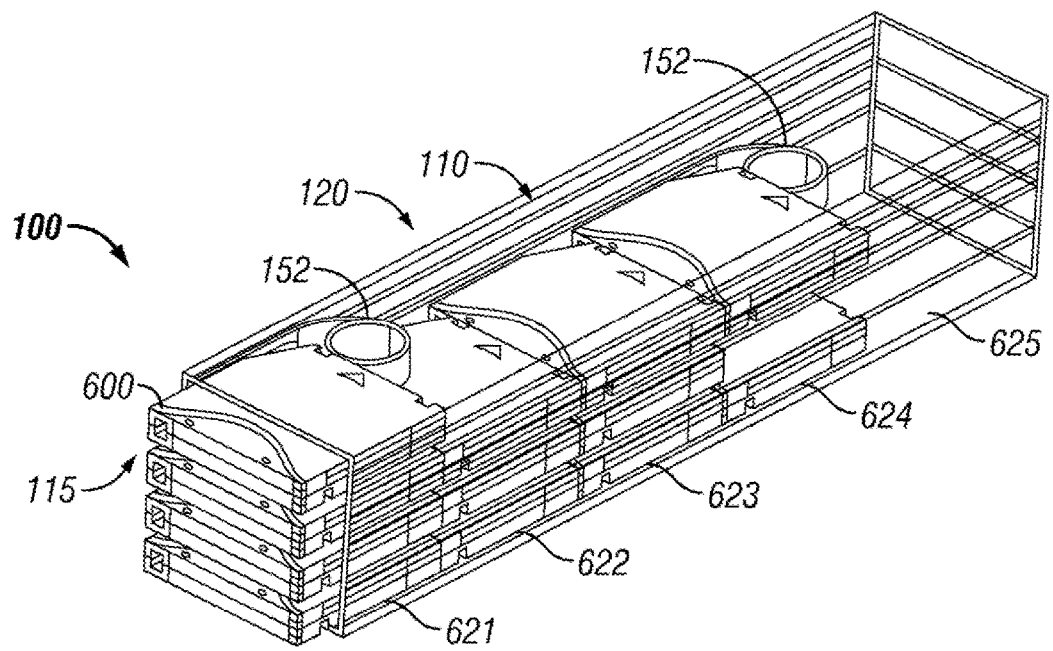
FIGS. 7A-7B are perspective views of a multi-cartridge deep slot cell according to one embodiment.
Figure 7B:
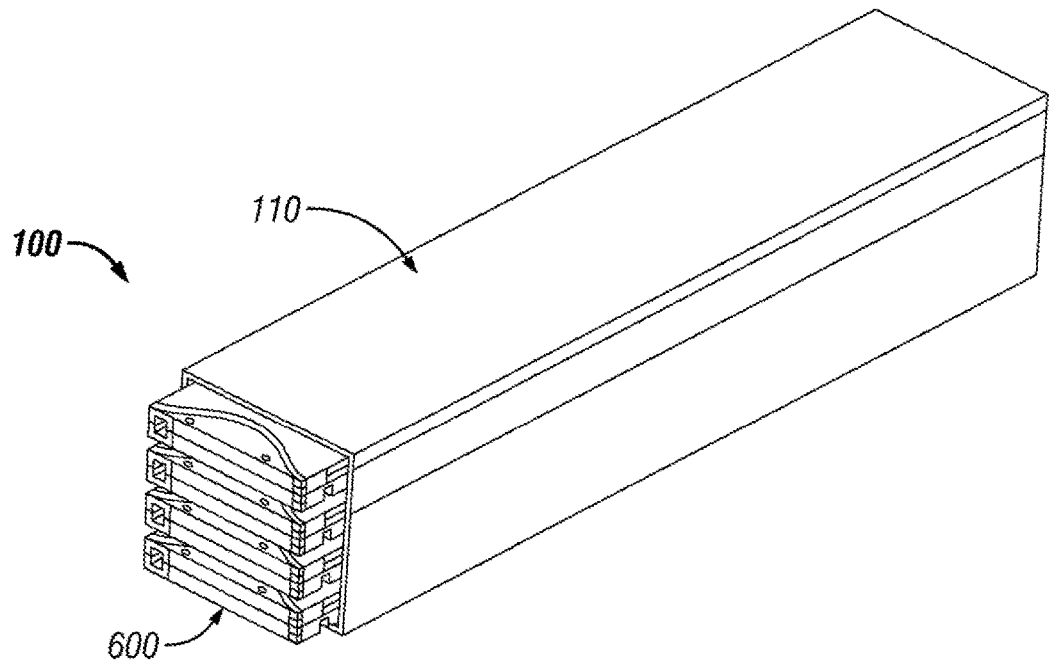

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
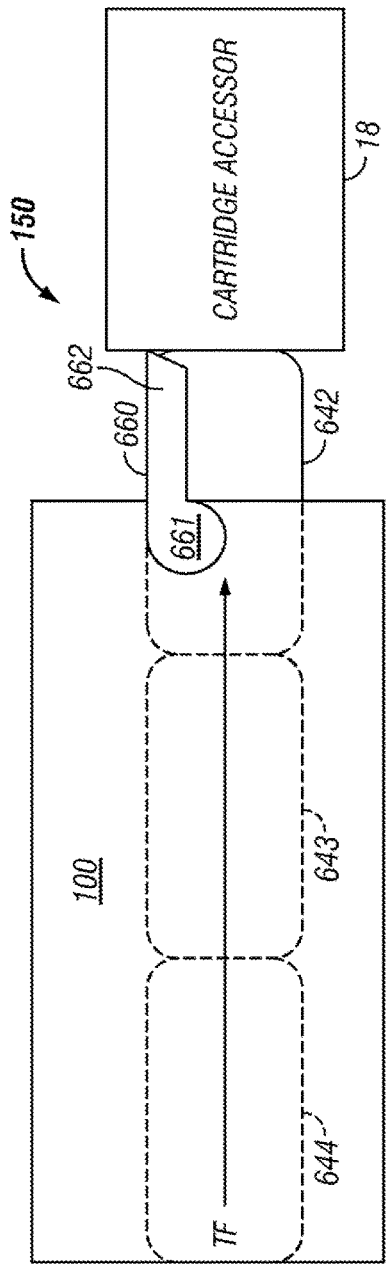
FIGS. 8A-8D are partial side views of a cartridge blocking mechanism according to one embodiment.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

Figure 8B:
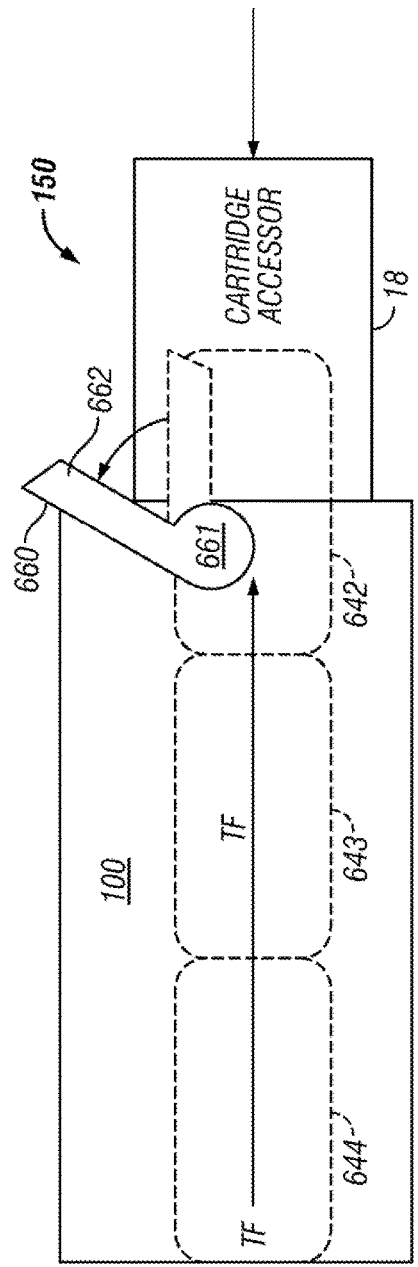
Figure 8C:
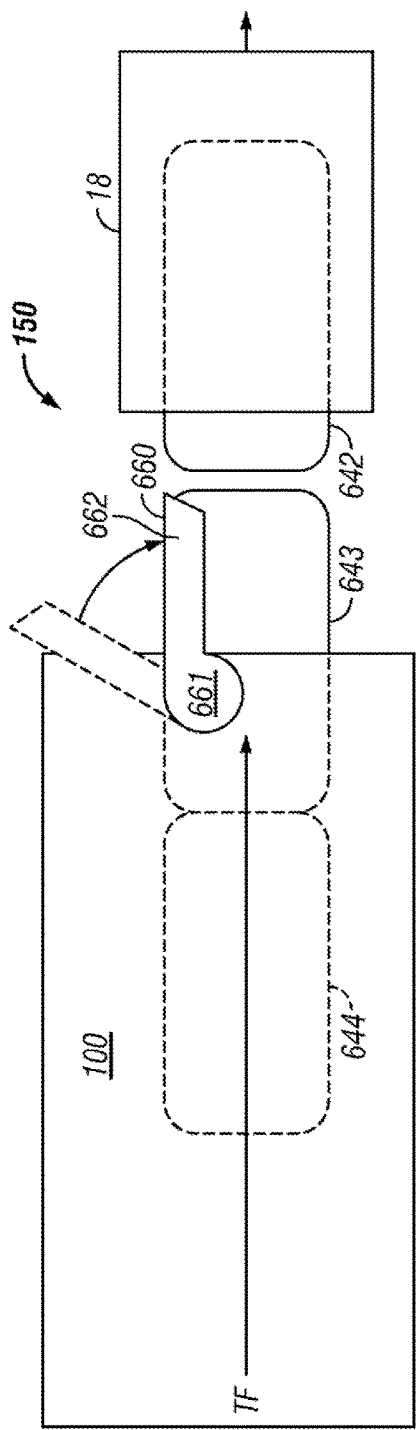

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
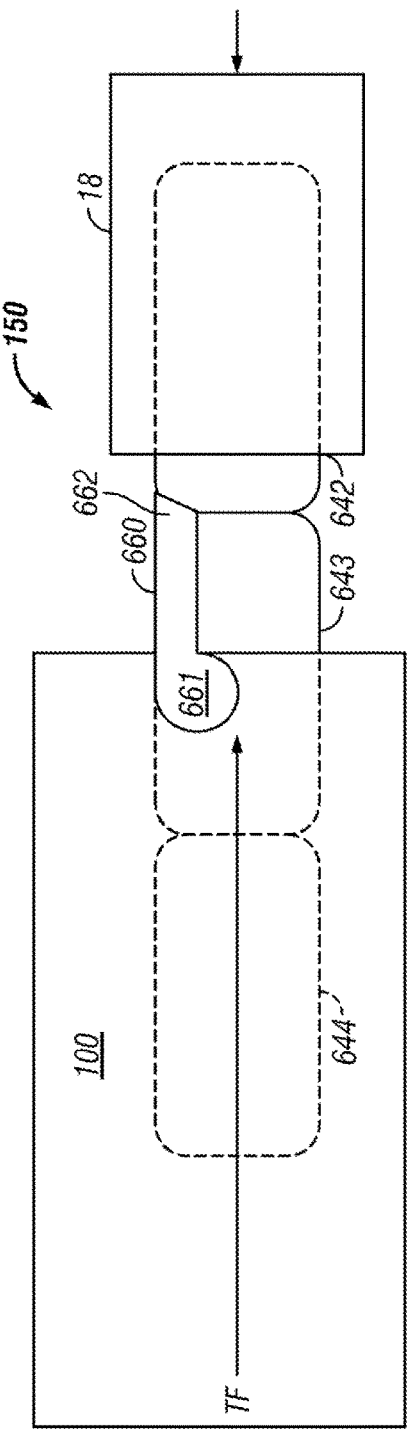

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
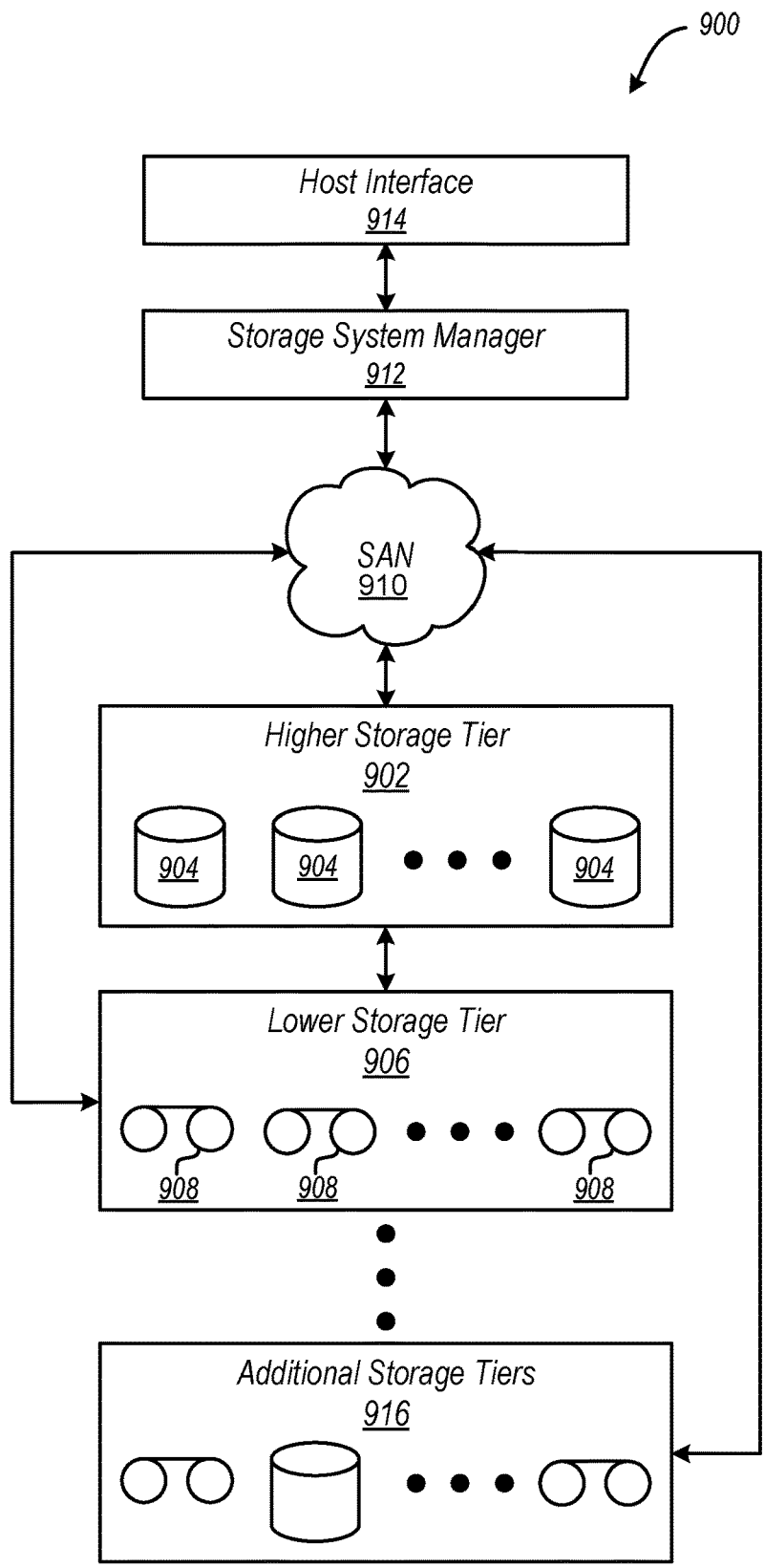
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Automated data storage libraries use one or more robotic mechanisms to move data storage cartridges back and forth from storage elements or import/export elements to media drives located within the library. While the precepts of the various embodiments of the present invention are applicable to any type of data storage library, and should be interpreted as such, much of the following description will describe embodiments in terms of an automated tape library. This is done by way of example only and without limitation.

Automated tape libraries use one or more robotic mechanisms to move tape cartridges back and forth from storage elements or import export elements to tape drives located within the tape library. Over a large population of tape libraries, variations in component or manufacturing quality or bugs related to the library firmware of the robot may result in the robot being unable to successfully handle the cartridges as desired. Although the library may not have a failure, performing robotic Error Recovery Processes (ERP's) downgrades the overall performance of the library. In some cases, it is difficult to diagnose the cause of the robotic cartridge handling issues. For example, if a robot position is incorrect when trying to grab a cartridge, it may be difficult to determine if the robot is too high or too low or too far to the left or to the right. Robot position information may be vitally important for trouble-shooting the tape library and determining a possible adjustment to the underperforming robot.

In some cases where a tape library has repeated issues, a video of the error would be helpful to help diagnose the root cause of the problem. If the tape library is deployed at a customer site, the field service personnel may attempt to take a video using their smart phone and various video recording applications (apps) that may be natively embedded in the standard Operating System (OS) of the smart phone. However, it is expected to be difficult to properly diagnose the problem, as field service personnel are inexperienced at capturing accurate video and would be expected to generate a video of marginal value by not showing a particular video angle or proper location.

Field service personnel often carry a video capture device, i.e. a smartphone, on service visits to the customer's library. Various embodiments described herein address the need for an apparatus on the library for attaching a smart phone or other image capturing device to the library components, such as the robotic accessor, in a manner that orients the smart phone to record a video at the appropriate angle and to focus on the correct points of interest. The video captured will help diagnose problems with the tape library robotics.

Figure 10A:
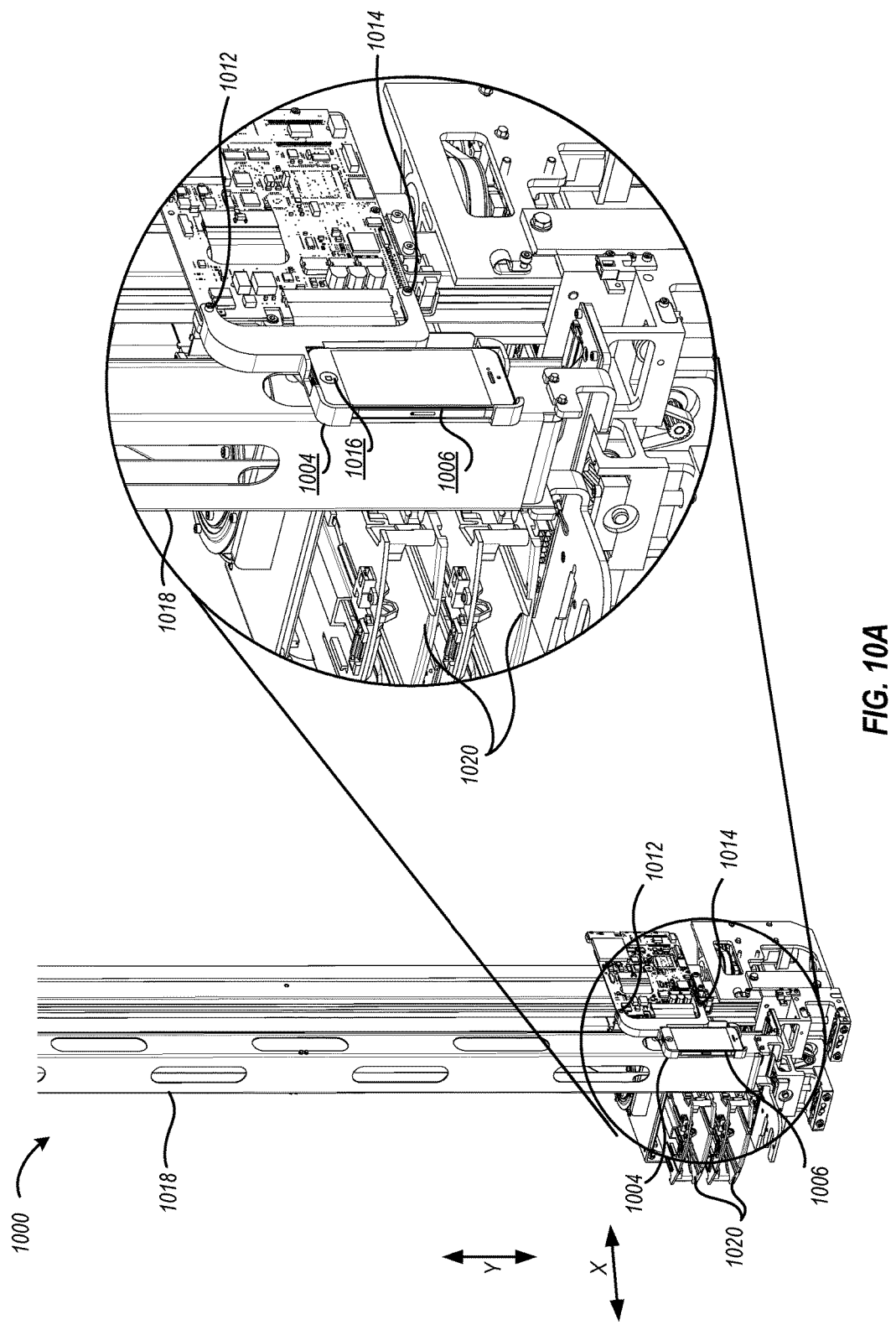
FIG. 10A is an expanded side view of the robotic accessor of a tape library according to one embodiment.
Figure 10B:
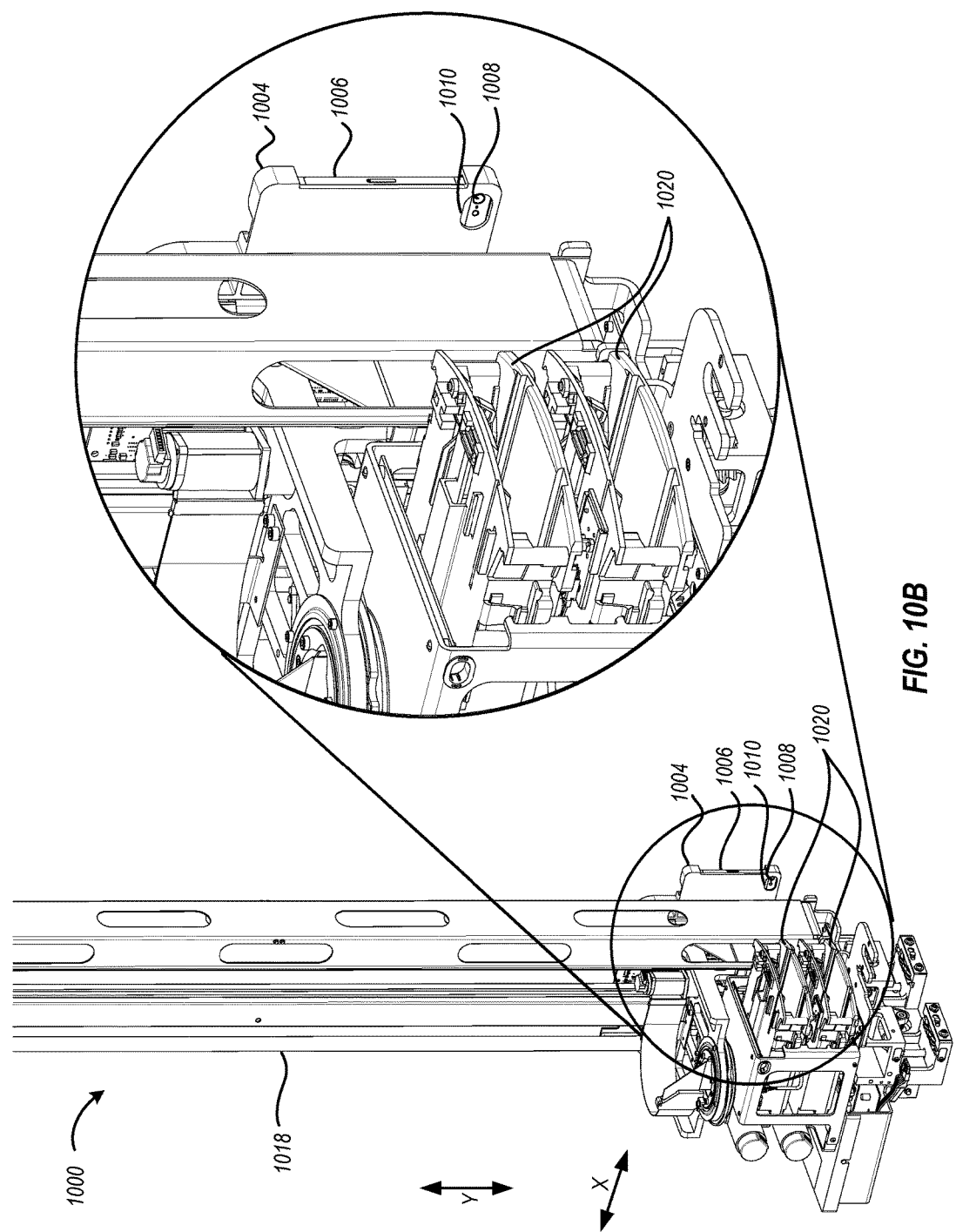
FIG. 10B is an expanded front view of the robotic accessor of a tape library according to one embodiment.

Referring back to FIG. 2, a tape library 10 has a robotic accessor 18 that has a gripper assembly 20 to move data storage cartridges to various locations within the tape library. According to one embodiment, FIGS. 10A and 10B show a magnified view of a robotic accessor 1018 with an additional bracket 1004 for mounting a mobile telephone 1006 to the robotic accessor 1018. The robotic accessor 1018 of FIGS. 10A and 10B may be, or be similar to, the robotic accessor 18 of FIG. 2 in some embodiments.

FIGS. 10A-10B depict an apparatus 1000, in accordance with one embodiment. As an option, the present apparatus 1000 may be implemented in conjunction with features from any other embodiment listed herein, such as those described with reference to the other FIGS. Of course, however, such an apparatus 1000 and others presented herein may be used in various applications and/or in permutations which may or may not be specifically described in the illustrative embodiments listed herein. Further, the apparatus 1000 presented herein may be used in any desired environment.

According to an exemplary embodiment, an apparatus 1000 includes an accessor 1018 configured to transport data storage cartridges in a library environment and a bracket 1004 that may receive a wireless image capture device 1006, for example iPhone™, GoPro™, Samsung™ Galaxy, etc, therein. Moreover, the bracket 1004 may be positioned to orient the wireless image capture device 1006 to capture images while the accessor 1018 is transporting data storage cartridges.

According to one embodiment, the apparatus 1000 includes a bracket 1004 that may be fixedly coupled to the accessor 1018 in a manner that the bracket 1004 may be removed from the accessor 1018 without damaging the apparatus 1000, i.e. detachably attached. For example, the bracket 1004 may be detachably attached to the accessor 1018 by being clipped to the accessor 1018, or attached by existing screws 1012, 1014 (as shown in FIG. 10A) on the accessor 1018, or attached by new screw positions on the accessor 1018, or snapped on, bolted on, taped on, etc.

In one embodiment of the apparatus 1000, the accessor 1018 includes a gripper 1020, where the bracket 1004 may be positioned to enable capture of images of the gripper 1020. In one approach, the bracket 1004 may be positioned to cause the wireless image capture device 1006 to move in a vertical and a horizontal direction with the gripper 1020 to enable capture of images of the gripper 1020 as the gripper 1020 moves in the vertical (Y) and a horizontal (X) direction to retrieve and grip, deliver and release, load and unload, etc. the data storage cartridge at the storage slots 16 (in FIG. 2), multi-cartridge deep slot cells 100 (in FIG. 2), data storage drives 15 (in FIG. 2), etc.

In another approach, the apparatus 1000 includes at least two grippers 1020 and the bracket 1004 may be positioned to orient the wireless image capture device 1006 to capture images of at least two of the grippers 1020.

In various embodiments, the bracket on the robotic accessor secures the wireless image capture device so that the camera of the wireless image capture device may be pointed at the grippers. From this position, video can be recorded of various activities of the grippers, for example, how the robotic accessor is grabbing the data storage cartridges; whether the robot is having a problem grabbing the data storage cartridges; whether the grippers are grabbing too high, too low, too far to the right, too far to the left; whether the robotic accessor is bouncing or vibrating; etc.

According to the embodiment of the apparatus 1000, the bracket 1004 may be positioned to orient the wireless image capture device 1006 to capture images of activity of the gripper 1020 performing work on at least one of a plurality of storage slots (see storage slots 16 in FIG. 2) in the library (see library 10 in FIG. 2). In some approaches, the wireless image capture device may capture images of activity of the gripper performing work on two storage slots, or on three storage slots, etc. In one approach, the bracket 1004 may be positioned to orient the wireless image capture device 1006 to capture images of activity of the gripper 1020 performing work on at least one of a plurality of tape drives (see data storage drive 15 in FIG. 2) in the library (see library 10 in FIG. 2). In other approaches, the wireless capture image device may capture images of activity of the gripper performing work on two data storage drives, or on three data storage drives, or on four data storage drives, etc.

In various embodiments, the bracket 1004 may be mounted so that the wireless image capture device 1006 has the control button 1016 accessible to the field service personnel. In other embodiments, the control button may not be accessible by the field service personnel after the wireless image capture device is positioned in the bracket. In such case, the wireless capture device may be controlled remotely.

In various embodiments, the bracket is mounted on the robotic accessor in a position that may direct the camera of the wireless image capture device at the activity under study on the robotic accessor so that the camera moves with the movements of the robotic accessor. In other approaches, the bracket is mounted on the robotic accessor so that the wireless image capture device may be positioned to capture images looking up at the grippers from the bottom of the accessor. In another approach the bracket is mounted on the robotic accessor so that the wireless image capture device may be positioned to capture images looking down at the grippers from above the grippers.

With continued reference to FIG. 10A, in one embodiment of apparatus 1000, the bracket 1004 may be positioned to hold the wireless image capture device 1006 without interfering with the movement of the accessor 1018. Furthermore, the bracket 1004 may be positioned to hold the wireless image capture device 1006 without interfering with operations within the library (see library 10 in FIG. 2).

Looking to FIG. 10A, according to the embodiment of apparatus 1000 the bracket 1004 may be configured to allow detachable coupling of the image capture device 1006 thereto. Furthermore, the bracket 1004 may securely hold the wireless image capture device 1006 so that the wireless image capture device 1006 may not move in the bracket 1004 while the accessor 1018 is transporting data storage cartridges. For example, the image capture device 1006 may be snapped into place, secured by constraining straps (e.g., Velcro straps, rubber bands, etc.), secured by side members that engage the sides and possibly the bottom of the image capture device, etc.

In some approaches, the bracket may be custom formed to fit a specific model of image capture device. In other approaches, the bracket may be designed to universally fit a generic type of image capture device such as a mobile phone. In such case, the bracket may be oriented or positionable to enable proper positioning of the camera of the image capture device.

The bracket 1004 may be formed using any conventional process. For example, the bracket 1004 may be formed from a 3D printer. In some approaches, the bracket for mounting the wireless image capture device may be printed on a 3D printer whenever required, e.g. on demand. 3D printing allows the appropriate bracket to be printed and quickly fabricated for different generations and manufacturers of wireless image capture devices. Thus, field service personnel may have a bracket fabricated that fits the wireless image capture device carried by the field service personnel for failure investigations on site at customer locations.

In various embodiments, the bracket may be formed of hard material, for example wood, metal, plastic, etc.

In one embodiment of apparatus 1000, the image capture device 1006 may be a mobile telephone. Looking to FIG. 10B, in the embodiment of apparatus 1000, the bracket 1004 includes an aperture 1010 therethrough. Moreover, the aperture 1010 may be aligned with a camera 1008 of the telephone 1006 when the telephone 1006 is mounted in the bracket 1004. Furthermore, in some approaches, the bracket may be strategically located to position the camera lens of the mobile telephone such that it may capture video of both of the dual grippers performing work on a specific side of the library where areas of interest such as storage slots and data storage drives are located.

With continued reference to FIGS. 10A and 10B, the wireless image capture device 1006 may not be hard-wired to a power source because the image capture device 1006 can capture images without an electrical connection to any other component on the apparatus 1000.

Figure 11:
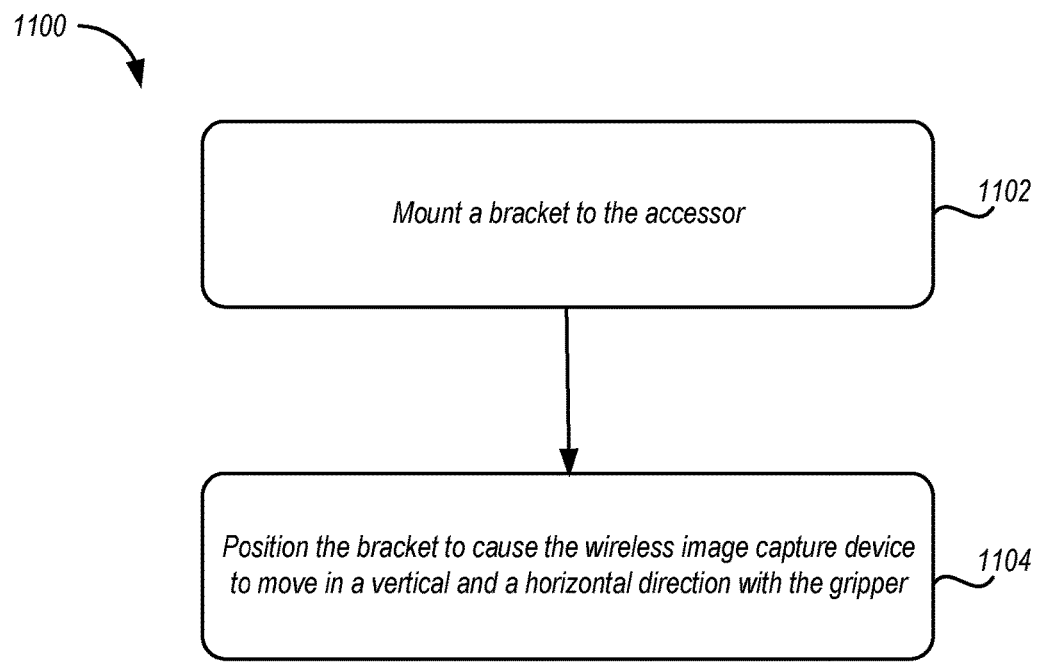
FIG. 11 is a flowchart of a method according to one embodiment.

FIG. 11 depicts a method 1100, in accordance with one embodiment. As an option, the present method 1100 may be implemented in conjunction with features from any other embodiment listed herein, such as those described with reference to the other FIGS. Of course, however, such a method 1100 and others presented herein may be used in various applications and/or in permutations which may or may not be specifically described in the illustrative embodiments listed herein. Further, the method 1100 presented herein may be used in any desired environment. Moreover, more or less operations than those shown in other FIGS may be included in method 1100, according to various embodiments. It should also be noted that any of the aforementioned features may be used in any of the embodiments described in accordance with the various methods.

An exemplary method for mounting a smart phone to the robotic accessor of a data storage library is provided in detail below according to one embodiment. In desired position on the robotic accessor, the smartphone may record a video with the proper alignment and focus in order to diagnose problems with the data storage library robotics.

Method 1100, as illustrated in FIG. 11 may start with step 1102 which involves mounting a wireless capture device to an accessor to capture images of an operation in a data storage library. One approach of method 1100 may involve mounting the bracket to the accessor where the accessor may be configured to transport data storage cartridges in a library environment. Moreover, the bracket may be configured to receive a wireless image capture device therein. And furthermore, the bracket may be mounted in a position to orient the wireless image capture device to capture images while the accessor is transporting data storage cartridges.

In one approach of step 1102 of method 1100, the bracket may be fixedly coupled to the accessor in a manner that the bracket may be removed from the accessor without damaging the apparatus, i.e. detachably attached. For example, the bracket may be detachably attached to the accessor by being clipped to the accessor, or attached by existing screws on the accessor, or attached by new screw positions on the accessor, etc. Typically, the bracket would be detachably attached to the carriage of the grippers.

In another approach of step 1102 of method 1100, the accessor may include a gripper, where the bracket may be positioned to enable capture of images of the gripper.

In step 1104, as shown in FIG. 11, the bracket is mounted where the bracket may be positioned to cause the wireless image capture device to move in a vertical and a horizontal direction with the gripper to enable capture of images of the gripper as the gripper moves in the vertical and a horizontal direction.

At the customer location, field service personnel may be requested by the support center or development lab to use a smart phone to record a video of the data storage library. A method described herein includes a sequence of steps for the field service personnel to follow in order to capture images of an operation in a data storage library which has a bracket mounted on an accessor according to one embodiment.

Figure 12:
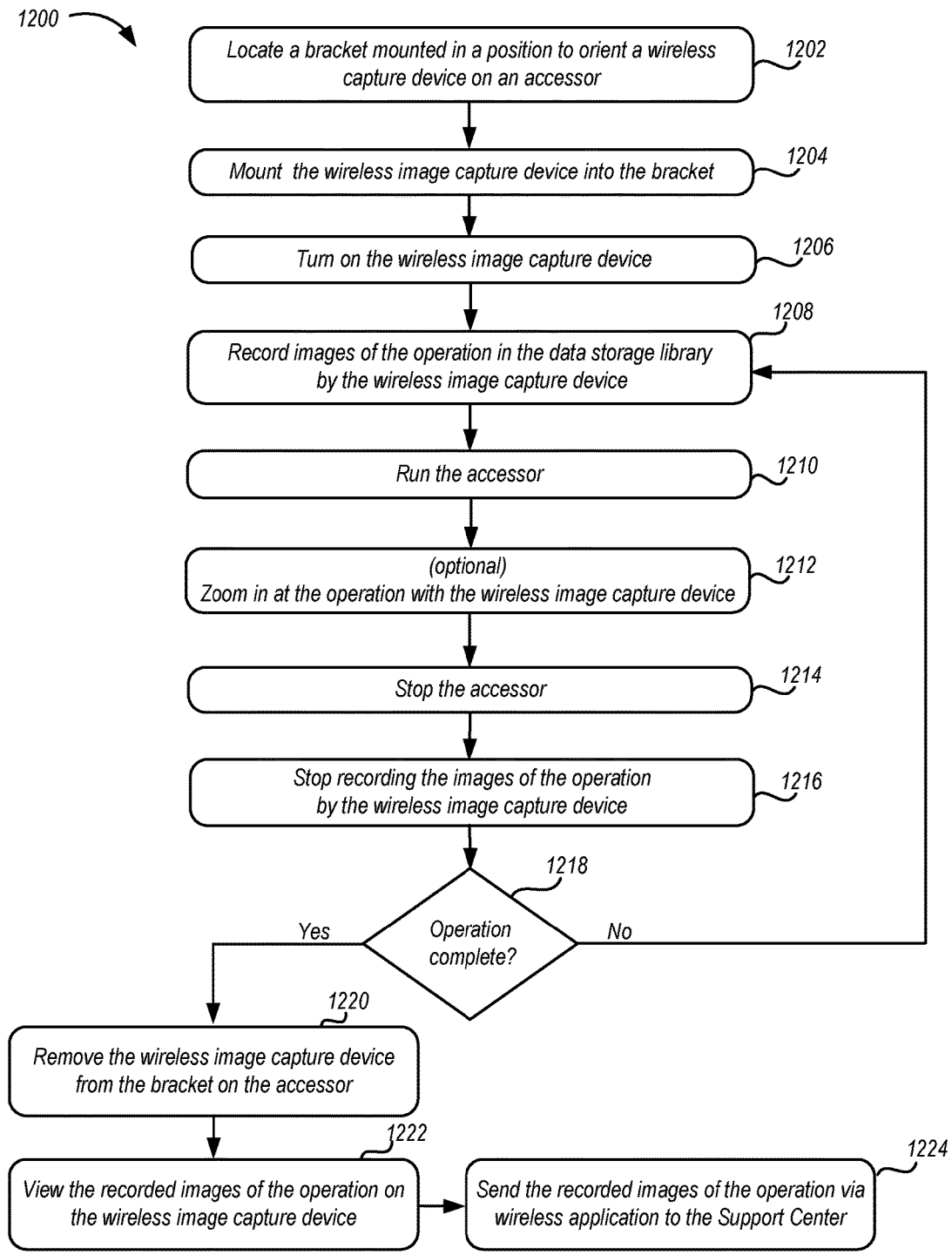
FIG. 12 is a flowchart of a method according to one embodiment.

FIG. 12 depicts a method 1200, in accordance with one embodiment. As an option, the present method 1200 may be implemented in conjunction with features from any other embodiment listed herein, such as those described with reference to the other FIGS. Of course, however, such a method 1200 and others presented herein may be used in various applications and/or in permutations which may or may not be specifically described in the illustrative embodiments listed herein. Further, the method 1200 presented herein may be used in any desired environment. Moreover, more or less steps than those shown in other FIGS may be included in method 1200, according to various embodiments. It should also be noted that any of the aforementioned features may be used in any of the embodiments described in accordance with the various methods.

In one embodiment, method 1200 involves a step 1202, as illustrated in FIG. 12 that may include locating a bracket mounted in a position to orient a wireless image capture device on the accessor. Moreover, the accessor may be configured to transport data storage cartridges in a library environment. Typically, the bracket would be detachably attached to the carriage of the grippers on the accessor. Furthermore, the bracket may be configured to receive the wireless image capture device therein.

In step 1204, the field service personnel may mount the wireless image capture device into the bracket where an aperture of the bracket may be aligned with an aperture of the wireless image capture device. In some approaches the wireless image capture device may be a mobile telephone. In other approaches, the field service personnel may mount the mobile telephone upside down so that the camera of the telephone is aligned with the aperture of the bracket.

In step 1206, the field service personnel may turn on the wireless image capture device, if not already running.

In step 1208, the field service personnel may start the recording of images of the operation being done by the robotic accessor in the data storage library.

In step 1210, the field service personnel may start running the accessor while the wireless image capture device is recording images of the operation such as moving the data storage cartridges in the data storage library.

In optional step 1212, the field service personnel may zoom the image capture device to record magnified images of the operation.

In step 1214, the field service personnel may stop the accessor. In various approaches, the accessor may be stopped by the field service personnel when the accessor completes the activity under study (i.e. the operation).

In step 1216, the recording of the images of the operation may be stopped on the wireless image capture device.

In decision step 1218, if the operation is not complete, the field service personnel returns to step 1208 and restarts recording on the wireless image capture device. If the operation is complete from step 1218, then the field service personnel may continue to step 1220 where the field personnel may remove the wireless image capture device from the bracket on the accessor.

In step 1222 the field service personnel may view the recorded images of operation on the wireless image capture device.

In step 1224, the field service personnel may send the recorded images of the accessor activity of the operation under study via a wireless application on the mobile telephone from the customer site where the data storage library is located to the support center or development lab. Experts at the support center or development lab may study the video and propose recommendations on repair actions for the field service personnel to perform on the robotics or automated data storage library system.

While the foregoing method may be performed, e.g., by a technician, other embodiments may include methodology whereby some of the foregoing steps are controlled electronically, by a remote user, etc.

Example 1: Controlled by Library and Field Service Personnel Remotely

In this example, the field service personnel may position and mount the wireless capture device on the accessor (steps 1202 and 1204). Using a remote controller, e.g. a laptop computer, tablet, iWatch paired to the iPhone on the accessor, library interface, etc, the field service personnel turns on the wireless image capture device (step 1206) and starts recording (step 1208). The Library is configured run the accessor and stop the accessor (steps 1210 and 1214). Then the field service personnel, using a remote controller, may zoom the image capture device to record magnified images of the operation (step 1212), may stop the recording of the images (step 1216), or restart recording images if the operation is not complete (step 1208). When the operation is complete (step 1218), the field service personnel removes the image capture device from the accessor (step 1220), and views the recorded images on the wireless capture device (step 1222). Optionally, the field service personnel may then upload the images to either the remote controller, or to the Support Center/Development Lab step 1224).

During step 1208, the video being captured during this time may be viewed simultaneously on the remote controller for the field service personnel to view while the operation is taking place. The field service personnel, using the remote controller, may zoom in at different times or different locations during video capture (step 1212). Moreover, the field service personnel may stop the video recording and restart the video recording at a different location or time (steps 1208, 1212, 1216).

Example 2: Controlled by Library, Positioned by Field Service Personnel, and Controlled by Support Center/Development Lab Remotely In this example, the field service personnel may position and mount the wireless capture device on the accessor (steps 1202 and 1204). The field service personnel, using a remote controller, may connect the wireless capture device with wireless server so that the Support Center/Development Lab may remotely control the wireless capture device on the accessor. The Support Center/Development Lab may remotely turn on the image capture device (step 1206) and start recording (step 1208). The Library Controller is configured to run the accessor and stop the accessor (steps 1210 and 1214). The Support Center/Development Lab, via remote controller, may zoom into selected images (step 1212), may stop the recording of the images (step 1216), or restart recording the images (step 1208). When the Support Center/Development Lab is satisfied with images (step 1218), the field service personnel may remove the image capture device from the accessor (step 1220), view the recorded images on the wireless capture device (step 1222), and, optionally, send, using wireless transfer, the image recordings, i.e. video, to the Support Center/Development Lab (step 1224).

Example 3: Positioned by the Field Service Personnel and Controlled by Support Center/Development Lab Remotely In this example, the field service personnel may position, mount the wireless capture device on the accessor, and turn on the wireless capture device (steps 1202 and 1204). The Support Center/Development Lab connects to the wireless capture device with wireless server so that the Support Center/Development Lab may remotely control the wireless capture device on the accessor. The Support Center/Development Lab may remotely turn on the image capture device (step 1206) and start recording (step 1208). The Support Center/Development Lab configures the library, and by remote controller, runs the accessor (step 1210) and stops the accessor (step 1212). The Support Center/Development Lab, via remote controller, may zoom into selected images (step 1212), may stop the recording of the images (step 1216), or restart recording the images (step 1208). When the Support Center/Development Lab is satisfied with images (step 1218), the field service personnel may remove the image capture device from the accessor (step 1220), view the recorded images on the wireless capture device (step 1222), and, optionally, send, using wireless transfer, the image recordings, i.e. video, to the Support Center/Development Lab (step 1224).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for mounting a wireless capture device to an accessor to capture images of an operation in a data storage library, the method comprising:
   mounting a bracket to the accessor,
      wherein the accessor is configured to transport data storage cartridges in a library environment,
      wherein the bracket is configured to receive a wireless image capture device therein,
   wherein the bracket is mounted in a position to orient the wireless image capture device to capture images while the accessor is transporting data storage cartridges,
   wherein the accessor includes a gripper, wherein the bracket is positioned to enable capture of images of the gripper,
   wherein the bracket is configured to allow detachable coupling of the wireless image capture device thereto.

2. A method as recited in claim 1, wherein the bracket is fixedly coupled to the accessor.

3. A method as recited in claim 1, wherein the bracket is positioned to cause the wireless image capture device to move in a vertical and a horizontal direction with the gripper to enable capture of images of the gripper as the gripper moves in the vertical and the horizontal direction.

4. A method as recited in claim 1, wherein the bracket is positioned to orient the wireless image capture device to capture images of the gripper performing work on at least one of a plurality of storage slots in the library environment.

5. A method as recited in claim 1, wherein the bracket is positioned to orient the wireless image capture device to capture images of the gripper performing work on at least one of a plurality of data storage drives in the library environment.

6. A method as recited in claim 1, wherein the accessor includes at least two grippers, wherein the bracket is positioned to enable capture of images of at least two of the grippers.

7. A method as recited in claim 1, wherein the bracket is positioned to hold the wireless image capture device without interfering with movement of the accessor.

8. A method as recited in claim 1, wherein the bracket is positioned to hold the wireless image capture device without interfering with operations within the library environment.

9. A method as recited in claim 1, wherein the bracket securely holds the wireless image capture device so that the wireless image capture device does not move in the bracket while the accessor is transporting data storage cartridges.

10. A method as recited in claim 1, wherein the wireless image capture device is a mobile telephone.

11. A method as recited in claim 10, wherein the bracket includes an aperture therethrough, said aperture being aligned with a camera of the mobile telephone when the mobile telephone is mounted in the bracket.

12. A method for capturing an image of an operation in a data storage library with a bracket on an accessor, the method comprising:
   locating the bracket mounted in a position to orient a wireless image capture device on the accessor;
   mounting the wireless image capture device into the bracket, wherein an aperture of the bracket is aligned with an aperture of the wireless image capture device;
   running the accessor while the wireless image capture device is recording images of the operation in the data storage library;
   stopping the recording of images of the operation by the wireless image capture device;
   removing the wireless image capture device from the bracket on the accessor; and
   viewing the recorded images.

13. The method as recited in claim 12, wherein the accessor is configured to transport data storage cartridges in a library environment.

14. The method as recited in claim 12, comprising instructing the wireless image capture device to zoom in to record magnified images.

15. The method as recited in claim 12, wherein the recording is stopped when the accessor completes the operation.

16. The method as recited in claim 12, wherein the accessor is stopped when the accessor completes the operation.

17. The method as recited in claim 12, wherein the wireless image capture device is a mobile telephone.

18. The method as recited in claim 17, comprising instructing the mobile telephone to send the recorded images of accessor activity of the operation via a wireless application on the mobile telephone to a support center.

* * * * *